United States Patent
Levin et al.

(10) Patent No.: US 11,356,474 B2
(45) Date of Patent: Jun. 7, 2022

(54) RESTRICT TRANSMISSION OF MANIPULATED CONTENT IN A NETWORKED ENVIRONMENT

(71) Applicant: Google LLC, Mountain View, CA (US)

(72) Inventors: Andrey Levin, Dublin (IE); Yintao Liu, Union City, CA (US); Sharath Ananth, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1029 days.

(21) Appl. No.: 16/062,540

(22) PCT Filed: Dec. 8, 2017

(86) PCT No.: PCT/US2017/065457
§ 371 (c)(1),
(2) Date: Jun. 14, 2018

(87) PCT Pub. No.: WO2019/112622
PCT Pub. Date: Jun. 13, 2019

(65) Prior Publication Data
US 2021/0168168 A1     Jun. 3, 2021

(51) Int. Cl.
*G06F 15/173* (2006.01)
*H04L 9/40* (2022.01)
(Continued)

(52) U.S. Cl.
CPC ...... *H04L 63/1466* (2013.01); *G10L 15/1822* (2013.01); *G10L 15/22* (2013.01);
(Continued)

(58) Field of Classification Search
CPC .... G06N 3/04; G06N 3/0454; G10L 15/1822; G10L 15/22; G10L 2015/088;
(Continued)

(56) References Cited

U.S. PATENT DOCUMENTS

| | | | |
|---|---|---|---|
| 6,304,636 B1 * | 10/2001 | Goldberg | H04L 51/066 379/215.01 |
| 7,756,535 B1 * | 7/2010 | Diao | H04L 51/12 455/466 |

(Continued)

FOREIGN PATENT DOCUMENTS

| | | |
|---|---|---|
| KR | 10-1045452 | 6/2011 |
| WO | WO-2017/117194 | 7/2017 |

OTHER PUBLICATIONS

International Preliminary Report on Patentability for PCT Appln. Ser. No. PCT/US2017/065457 dated Jun. 18, 2020 (9 pages).

(Continued)

*Primary Examiner* — Liang Che A Wang
(74) *Attorney, Agent, or Firm* — Dority & Manning, P.A.

(57) ABSTRACT

Systems and methods of the present disclosure relate generally to a data processing system that identifies possibly manipulated or fraudulent digital components in a computer network environment. The data processing system can improve the efficiency and effectiveness of data packet (or other protocol based) transmission over one or more computer networks by, for example, preventing or reducing the number of manipulated or fraudulent digital component transmissions.

20 Claims, 4 Drawing Sheets

(51) Int. Cl.
    *G10L 15/18*       (2013.01)
    *G10L 15/22*       (2006.01)
    *G10L 15/08*       (2006.01)

(52) U.S. Cl.
    CPC .... *H04L 63/1425* (2013.01); *G10L 2015/088* (2013.01); *G10L 2015/223* (2013.01)

(58) Field of Classification Search
    CPC ........... G10L 2015/223; H04L 41/5054; H04L 51/12; H04L 63/0227; H04L 63/10; H04L 63/1416; H04L 63/1425; H04L 63/1433; H04L 63/1466; H04L 63/20
    USPC ................................... 709/224, 232; 726/22
    See application file for complete search history.

(56) References Cited

U.S. PATENT DOCUMENTS

| | | | |
|---|---|---|---|
| 2003/0088627 | A1 | 5/2003 | Rothwell et al. |
| 2005/0076084 | A1* | 4/2005 | Loughmiller ........ G06Q 10/107 709/206 |
| 2011/0301941 | A1* | 12/2011 | De Vocht .............. G06F 40/216 704/9 |
| 2014/0222436 | A1 | 8/2014 | Binder et al. |
| 2017/0052857 | A1* | 2/2017 | Jennings ................. G06F 11/10 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0186032 | A1 | 6/2017 | Rangasamy Kannadasan et al. |
| 2017/0277676 | A1* | 9/2017 | Vogel ..................... G06F 40/284 |
| 2017/0277782 | A1* | 9/2017 | Vogel ..................... G06F 16/334 |
| 2017/0277996 | A1* | 9/2017 | Vogel ....................... G06F 40/30 |
| 2017/0358301 | A1 | 12/2017 | Raitio et al. |
| 2018/0182151 | A1* | 6/2018 | Liu .......................... G10L 13/08 |
| 2019/0005439 | A1* | 1/2019 | Nandury ................ G06Q 50/28 |
| 2019/0340575 | A1* | 11/2019 | Kankaria ............. H04W 12/08 |

OTHER PUBLICATIONS

Examination Report for IN Appln. Ser. No. 201847003560 dated Aug. 26, 2020 (5 pages).
First Office Action for CN Appln. Ser. No. 201780013402.7 dated Jul. 6, 2020 (10 pages).
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Benevenuto et al., "Detecting Spammers on Twitter", Jul. 14, 2010, XP055486377, Retrieved from the Internet: URL:https://pdfs.semanticscholar.org/3709/2f9c79cb6220fd6f01882e9e3clb41d0750e.pdf?ga=2.185452585.1822534023.1529499559-2135265224.1502202819 [retrieved on Jun. 20, 2018], 10 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion for PCT Appl. Ser. No. PCT/US2017/065457 dated Jul. 2, 2018 (13 pages).
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant', BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.

(56) References Cited

OTHER PUBLICATIONS

Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Radulescu et al., "Identification of Spam Comments using Natural Language Processing Techniques", 2014 IEEE 10th International Conference on Intelligent Communication and Processing (ICCP), IEEE, Sep. 4, 2014, pp. 29-35, XP032671026.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Benevenuto et al., "Detecting Spammers on Twitter", CEAS 2010—Seventh annual Collaboration, Electronic messagin, Anti-Abuse and Spam Conference, Jul. 13-14, 2010 (10 pages).
Extended European Search Report for EP Appln. Ser. No. 20153325.4 dated Feb. 25, 2020 (13 pages).
Radulescu et al., "Identification of Spam Comments using Natural Language Processing Techniques", 2014 IEEE 10th International Conference on Intelligent Computer Communication and Processing (ICCP), IEEE, Sep. 2, 2014, pp. 29-35 (7 pages).

\* cited by examiner

RESTRICT TRANSMISSION OF MANIPULATED CONTENT IN A NETWORKED ENVIRONMENT

RELATED APPLICATIONS

This application is a U.S. National Stage under 35 U.C.S. § 371 of International Patent Application No. PCT/US2017/065457, filed on Dec. 8, 2017 and designating the United States, and is hereby incorporated by reference herein in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to digital component objects can be complicated by a large number of digital component objects that can initiate network transmissions of network traffic data between computing devices.

SUMMARY

At least one aspect is directed to a system to restrict content transmission in a networked environment. The system can include a data processing system that can include an interface to receive a content request from a client computing device. The system can include a content selector component that is executed by the data processing system. The content selector component can select a first digital component based on the content request. The first digital component can include a first plurality of characters. The system can include a manipulation detection component that is executed by the data processing system. The manipulation detection component can retrieve a dictionary that includes an indication of a portion of candidate characters included in a plurality of digital components. The manipulation detection component can convert a first plurality of characters into a character array based on the dictionary that can include the indication of the portion of the candidate characters included in the plurality of digital components. The manipulation detection component can classify the first digital component into a first class of a plurality of classes based on a sequence of the first plurality of characters in the character array. The manipulation detection component can determine to not include the first digital component in a response to the content request from the client computing device based on the classification of the first digital component into the first class of the plurality of classes. The manipulation detection component can generate the response based on the content request from the client computing device.

At least one aspect is directed toward a method to restrict content transmission in a networked environment. The method can include receiving, by a data processing system, a content request from a client computing device. The method can include selecting, by a content selector component executed by the data processing system, a first digital component based on the content request. The first digital component can include a first plurality of characters. The method can include retrieving, by a manipulation detection component executed by the data processing system, a dictionary that can include an indication of a portion of candidate characters included in a plurality of digital components. The method can include converting, by the manipulation detection component, the first plurality of characters into a character array based on the dictionary. The method can include classifying the first digital component into a first class of a plurality of classes based on a sequence of the first plurality of characters in the character array. The method can include determining, by the manipulation detection component, to not include the first digital component in a response to the content request from the client computing device based on the classification of the first digital component into the first class of the plurality of classes. The method can include generating, by the data processing system, the response based on the content request from the client computing device.

At least one aspect of the disclosure is directed to a digital assistant device can include an audio driver, a transducer, a sensor to detect an input audio signal, and a pre-processor component. The pre-processor component can be coupled to the audio driver, the transducer, and the sensor. The pre-processor can filter the input audio signal to create a filtered input audio signal. The pre-processor can convert the filtered input audio signal to data packets. The pre-processor can transmit the data packets to a data processing system. The data processing system can include one or more processors and memory that execute a natural language processor component, a content selector component, an interface, and a manipulation detection component. The data processing system can receive, via the interface, from the pre-processor component, the data packets comprising the filtered input audio signal detected by the sensor. The data processing system can identify, by the natural language processor component, a content request in the filtered input audio signal. The data processing system can select, by the content selector component, a first digital component based on the content request. The first digital component can include a first plurality of characters. The data processing system can retrieve, by the manipulation detection component, a dictionary that can include an indication of a portion of candidate characters included in a plurality of digital components. The data processing system can convert, by the manipulation detection component, first plurality of characters into a character vector based on the dictionary comprising the indication of the portion of the candidate characters included in the plurality of digital components. The data processing system can classify, by the manipulation detection component, the first digital component into a first class of a plurality of classes based on a sequence of the first plurality of characters in the character vector. The data processing system can determine, by the manipulation detection component, to not include the first digital component in a response to the content request from the client computing device based on the classification of the first digital component into the first class of the plurality of classes. The data processing system can generate, by the manipulation detection component, the response based on the content request from the client computing device, the response not including the first digital component based on the determination to not include the first digital component in the response.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
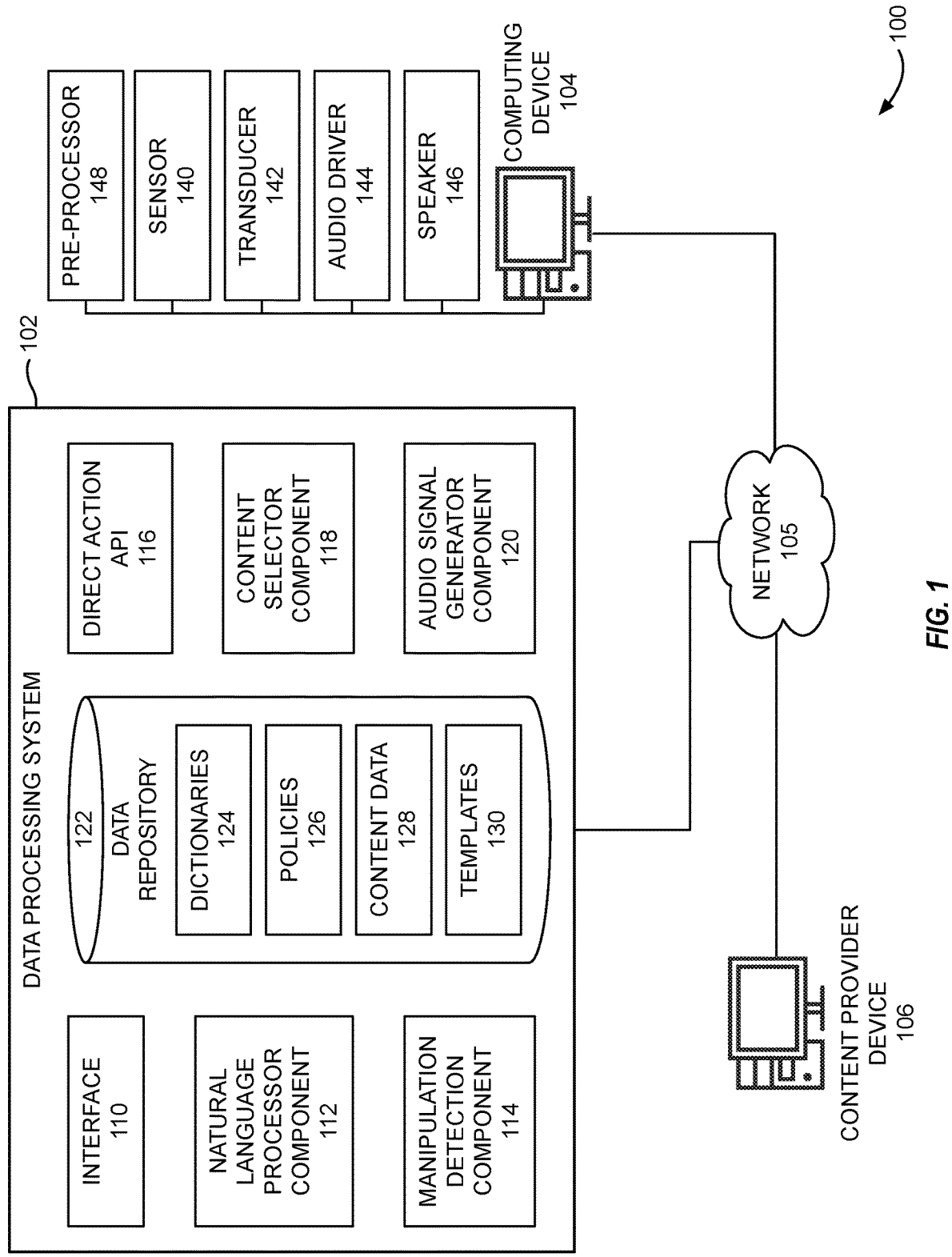
FIG. 1 depicts a system to restrict content transmission in a networked environment.

Following below are more detailed descriptions of various concepts related to, and implementations of, methods, apparatuses, and systems to restrict content transmission in a networked environment. The various concepts introduced above and discussed in greater detail below may be implemented in any of numerous ways.

Systems and methods of the present disclosure relate generally to a data processing system that identifies possibly manipulated or fraudulent digital components in a computer network environment. The data processing system can improve the efficiency and effectiveness of data packet (or other protocol-based) transmission over one or more computer networks by, for example, preventing or reducing the number of manipulated or fraudulent digital component transmissions. The manipulated or fraudulent digital components can be content items that include text or other content that is configured to not be detected by manual or automatic content filters. The manipulation of the text can include the inclusion of homoglyphs, the inclusion of repeated characters, the deletion of characters, the merging of words, the transposition of characters, or any combination thereof.

The systems and methods described herein can be in or with a digital assistant or other audio-based system. For example, the system can include a data processing system that receives an input audio query, which can also be referred to as an input audio signal. From the input audio query, the data processing system can identify a request and a trigger keyword corresponding to the request. Based on the trigger keyword or the request, the data processing system can generate a response that can include one or more digital components. The data processing system can select the digital components or the digital components can be provided to the data processing system from a third party. The digital components can be user generated content, such as reviews or comments. The data processing system can process the digital components to determine if the digital components are fraudulent, manipulated, or should be marked as spam. By identifying manipulated digital components, the data processing system can delete, purge, bar, or otherwise restrict the transmission of the digital component, which can reduce the total consumption of computational power, power, memory, and bandwidth as undesirable digital components are not transmitted through the network to client computing devices.

The data processing system can then select non-manipulated digital components that can be provided by a packet or other protocol-based data message transmission via a computer network to a client computing device. The digital component can also be referred to as a content item. A digital component can be included in the digital component. The output signal that includes the selected digital component can cause an audio driver component of the client computing device to generate an acoustic wave, e.g., an audio output, which can be output from the client computing device.

FIG. 1 illustrates an example system 100 to restrict content transmission in a networked environment. The data processing system 102 can include at least one server having at least one processor. For example, the data processing system 102 can include a plurality of servers located in at least one data center or server farm. The data processing system 102 can determine, from an input audio signal, a request and a trigger keyword associated with the request. Based on the request and trigger keyword the data processing system 102 can determine or select at least one action data structure, and can select at least one digital component (and initiate other actions as described herein).

The data processing system 102 can include multiple, logically-grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high-performance storage systems on localized high-performance networks. Centralization of all or some of the data processing system 102 components, including servers and storage systems, and coupling them with advanced system management tools, allows more efficient use of server resources, which saves power and processing requirements and reduces bandwidth usage.

The data processing system 102 can include at least one natural language processor (NLP) component 112, at least one interface 110, at least one manipulation detection component 114, at least one content selector component 118, at least one audio signal generator component 120, at least one direct action application programming interface (API) 116, and at least one data repository 122. The NLP component 112, interface 110, manipulation detection component 114, content selector component 118, audio signal generator component 120, and direct action API 116 can each include at least one processing unit, server, virtual server, circuit, engine, agent, appliance, or other logic device such as programmable logic arrays configured to communicate with the data repository 122 and with other computing devices (e.g., at least one client computing device 104, or at least one content provider computing device 106) via the at least one computer network 105. The network 105 can include computer networks such as the internet, local, wide, metro or other area networks, intranets, satellite networks, other computer networks such as voice or data mobile phone communication networks, and combinations thereof.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information, data provided by the data processing system 102, or otherwise interact with the data processing system 102 or the content provider device 106.

The network 105 can include, for example, a point-to-point network, a broadcast network, a wide area network, a local area network, a telecommunications network, a data communication network, a computer network, an Asynchronous Transfer Mode (ATM) network, a Synchronous Optical Network (SONET) network, a Synchronous Digital Hierarchy (SDH) network, a wireless network or a wireline network, and combinations thereof. The network 105 can include a wireless link, such as an infrared channel or satellite band. The topology of the network 105 may include a bus, star, or ring network topology. The network 105 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), Long-Term Evolution (LTE), or universal mobile telecommunications system ("UMTS"). Different types of data may be transmitted via different protocols, or the same types of data may be transmitted via different protocols.

The data processing system 102 can include a manipulation detection component 114. The manipulation detection component 114 can include an application, script, or program that is executed by the data processing system 102 to detect digital components that include manipulated text. The manipulation detection component 114 can restrict the transmission of the manipulated digital component in a networked environment by detecting manipulated digital components and then preventing (or reducing) the transmission of the manipulated digital components to client computing devices 104.

The manipulation detection component 114 can identify manipulated digital components that are provided by the content provider devices 106. The manipulated digital components can include content that is configured to appear as if the digital component originated from a different content provider device 106. The manipulated digital components can include content that is intended, by the content provider device 106, to confuse or deceive an end user viewing the digital component. The manipulated digital components can include content configured to pass through automated and manual filters (e.g., spam filters).

The manipulation to the digital components can include the manipulation of the text in the digital components. The manipulations can include replacing characters with other characters, intermingling additional symbols, removing or adding letters, merging words, or transposing letters. Replacing characters with other characters can include replacing letters with homoglyphs (e.g., replacing uppercase O with a zero), replacing a character with a similar looking symbol (e.g., replacing an "a" with an @), or replacing letters that sound similar (e.g., replacing a "w" with a "v"). Intermingling additional symbols can include adding special characters, punctuation, or spaces to the words. Adding or removing letters can include duplicating one or more letters, adding random letters, removing intentionally repeated letters (e.g., replacing better with beter), or removing random letters. Merging words can include removing the space between neighboring words. Transposing letters can include transposing letter within the body of a word (e.g., replacing download with downlaod).

The manipulated text can be in digital components that the content provider devices 106 provides to the data processing system 102 or the client computing device 104. The digital components can include electronic documents, web pages, ads, images, output audio files, output video files, uniform resource locators (URLs), visual uniform resource locators (vURLs), or other types of electronic content. The digital components can be retrieved from the content provider device 106 by the data processing system 102. For example, the digital components can include user generated content that is hosted or provided by the content provider device 106. The user generated content can include online comments or reviews. In one example, the comments can be related to a user's reviews of a restaurant.

Receiving an input query for information about a given restaurant, the data processing system 102 can search webpages provided by the content provider device 106 for reviews of the given restaurant. The digital components the data processing system 102 selects for a response can include reviews of the restaurant provided by the content provider device 106 or one or more of the comments (related to the given restaurant) made on the content provider device's webpages.

For example, in response to the input query "Ok, how do people like restaurant XYZ," the data processing system 102 can select a comment made by a user regarding the restaurant XYZ on a webpage hosted by the content provider device 106. For example, the comment can be a review stating "Restaurant XYZ is a great place for a romantic dinner." The data processing system 102 can include the comment in the response. For example, the response can be "Restaurant XYZ has favorable reviews. It was mentioned that restaurant XYZ is a great place for a romantic dinner."

The manipulation detection component 114 can detect manipulated text within digital components and then restrict the transmission of those digital components. For example, the digital component can be a text-based ad from which the manipulation detection component 114 can extract the text and determine if the text is manipulated.

The manipulation detection component 114 can determine if a given digital component includes manipulated text by retrieving a dictionary 124 from the data repository 122. The dictionary 124 can indicate which characters (or symbols) are most likely to occur in digital components. The manipulation detection component 114 can select the dictionary 124 from a plurality of different dictionaries 124 based on the language or subject matter of the digital component being tested.

To determine if a digital component is manipulated, the manipulation detection component 114 can extract the text of the digital component as a character set. If the digital component is video-based or audio-based, the manipulation detection component 114 can generate a transcript of the words spoken in the digital component and then extract the text of the digital component as a character set. The manipulation detection component 114 can divide the full character set into different portions. For example, the manipulation detection component 114 can select and analyze only about 160 characters at a time. If the digital component (or a resulting character set) includes less than 160 characters, the manipulation detection component 114 can zero-pad the character set to reach the 160 length. If the character set includes more than 160 characters, the manipulation detection component 114 can use a sliding window to divide the character set into different portions that each include 160 characters. For example, each portion can be between about 100 and about 1,000 characters, between about 150 and about 800 characters, between about 150 and about 600 characters, between about 150 and about 400 characters, or between about 150 and about 200 characters.

The manipulation detection component 114 can generate a character array for the character set (or portions thereof if the character set is divided into different portions). The dictionary 124 can include a value or array for each character listed in the dictionary 124. The manipulation detection component 114 can use the dictionary 124 to convert the character array from an array of characters into an array of integers. For example, each possible character can be represented in the dictionary 124 as an integer. The dictionary 124 can be used as a lookup table to convert the input character into an integer. In some implementations, the dictionary 124 only includes the characters that are most likely to occur in a non-manipulated digital component. The dictionary 124 can include one or more characters that can occur in non-manipulated or manipulated digital components. If the input character is not in the dictionary 124, the manipulation detection component 114 can place a 0 in the character array for the character. The dictionary 124 can be one hot encoded to represent each character as a binary array. The character array can be one hot encoded once converted to an array of integers.

The manipulation detection component 114 can generate the at least one dictionary 124. To generate the dictionaries 124, the manipulation detection component 114 can receive a plurality of digital components. The digital components can be non-manipulated digital components. The manipulation detection component 114 can parse through the received digital components to determine the number of occurrences of each character in the received digital components. For example, the manipulation detection component 114 can tally the number of times "a," "b,", "c," and so on appear in the received digital components. The manipulation detection component 114 can tally the number of occurrences for all types of characters including, letters, numbers, emoji, and special characters. The list of all possible characters can be referred to as candidate characters.

The manipulation detection component 114 can rank the candidate characters based on the number of times each of the respective candidate characters occurred in the received digital components. The manipulation detection component 114 can generate the dictionary by selecting, from the ranked candidate characters, the candidate characters that occur most frequently. For example, the manipulation detection component 114 can select the most commonly occurring 50, 60, 70, 100, 125, 150, 175, 200, 250, 300, 350, 400, 450, 500 characters (or any range therein) for a dictionary 124. The dictionary 124 can include more than 500 characters.

The manipulation detection component 114 can generate different dictionaries 124 for different groupings or categories of digital components. The groupings can be language-based or subject matter-based. For example, the manipulation detection component 114 can receive a plurality of digital components of a specific language and generate a dictionary 124 specific to that language. In another example, the manipulation detection component 114 can receive a plurality of digital components each having subject matter pertaining to a specific category (e.g., mobile games) and generate a dictionary 124 for mobile games based on the digital components having subject matter pertaining to mobile games.

The manipulation detection component 114 can include a machine learning module that can classify the digital component into one of a plurality of classes. The machine learning module can include a long short-term memory (LSTM) model or other recurrent neural network for classifying the input character strings. The LSTM model can be implemented with softmax function in one or more layers of the network. The LSTM model can be a three level LSTM. The LSTM model can include between about 50 and 300, between about 100 and about 300, or between about 200 and about 300 nodes. The classes can include a manipulated class and a non-manipulated class. Each class can correspond to a respective output node.

The manipulation detection component 114 can process the character array character by character. For example, the classification of the character array can be based on the sequence (or order) of the characters in the character array. If the manipulation detection component 114 classifies the digital component into a classification associated with manipulated digital components, the manipulation detection component 114 can determine to not transmit the digital component to the client computing device 104.

The system 100 can also include one or more client computing devices 104 and one or more content provider devices 106. A client computing device 104 and a content provider computing device 106 can each include at least one logic device such as a computing device having a processor to communicate with each other or with the data processing system 102 via the network 105. The client computing device 104 and the content provider computing device 106 can each include at least one server, processor or memory, or a plurality of computation resources or servers located in at least one data center. The client computing device 104 and the content provider computing device 106 can each include at least one computing device such as a desktop computer, laptop, tablet, personal digital assistant, smartphone, portable computer, server, thin client computer, virtual server, or other computing device.

The client computing device 104 can include at least one sensor 140, at least one transducer 142, at least one audio driver 144, at least one speaker 146, and at least one pre-processor 148. The client computing device 104 can be a digital assistant device. The digital assistant device can be speaker-based. The sensor 140 can include a microphone (or other audio input sensor) or a camera. The sensor 140 can be referred to as an interface. Other interfaces can also include the networking connection of a computing device, screen, or input devices. The transducer 142 can convert the audio input into an electronic signal, or vice-versa. The audio driver 144 can include a script or program executed by one or more processors of the client computing device 104 to control the sensor 140, the transducer 142 or the audio driver 144, among other components of the client computing device 104 to process audio input or provide audio output. The speaker 146 can transmit the audio output signal.

The client computing device 104 can include a pre-processor component 148. The pre-processor component 148 can include one or more processors. The pre-processor component 148 can perform one or more functions on the input audio signal before the input audio signal is processed by the data processing system 102 or other components of the client computing device 104. The pre-processor component 148 can be coupled with the audio driver 144, the transducer 142, and the sensor140. The pre-processor component 148 can filter the input audio signals detected by the sensor 140 (or input audio signals that are otherwise received by the client computing device 104) to create a filtered input audio signal. The filtering by the pre-processor 148 can include filtering (or reducing) noise in the input audio signal, the amplification of predetermined frequencies in the input audio signal, the reduction of predetermined frequencies in the input audio signal, or up-sampling or down-sampling of the input audio signal. The pre-processor component 148 can convert the filtered input audio signal to data packets and transmit the data packets to the data processing system 102 via the network 105.

The client computing device 104 can be associated with an end user that enters voice-based, text-based, or image-based queries into the client computing device 104 (via an interface) and can receive a response to the queries from the data processing system 102. The response can be in the same form as the query. For example, in response audio input query that is voice-based, the data processing system 102 (or the content provider device 106) can provide an output in the form of a computer generated voice file to the client computing device 104, which the client computing device 104 can output from the speaker 146. The audio output can correspond to an action data structure received from the direct action API 116, or a digital component selected by the content selector component 118. The computer generated voice can include recordings from a real person or computer generated language.

The client computing device 104 can include an application, script, or program that is provided by (or associated with the data processing system 102) that enables the client computing device 104 to communicate the input audio signals to at least one interface 110 of the data processing system 102. The data processing system 102 can communicate with the application to enable the data processing system 102 to drive components of the client computing device 104 to render output audio signals (e.g., for action data structures) or other output signals (e.g., digital components).

The content provider computing device 106 can provide digital component for rending on the client computing device 104. The content provider device 106 can transmit the digital component to the client computing device 104, bypassing the data processing system 102. The content provider device 106 can provide the digital components to the data processing system 102, which can provide the digital components to the client computing device 104. The digital components can be audio-based, text-based, or video-based digital components or action data structures for display by the client computing device 104 as an audio output. The action data structure or digital component can include an organic response or offer for a good or service, such as a voice based message that states: "Today it will be sunny and 80 degrees at the beach" as an organic response to a voice-input query of "Is today a beach day?". The data processing system 102 (or other system 100 component such as the content provider computing device 106 can also provide a digital component as a response, such as a voice or text message based digital component offering sunscreen.

The content provider computing device 106 can provide the digital components to the data processing system 102 for storage in the data repository 122. The action data structures and digital components can include packet-based data structures for transmission via the network 105. The content provider computing device 106 can also provide audio or text-based digital components (or other digital components) to the data processing system 102 where they can be stored in the data repository 122. The data processing system 102 can select the audio action data structures or text-based digital components and provide (or instruct the content provider computing device 106 to provide) them to the same or different client computing devices 104 responsive to a query received from one of those client computing device 104. The audio-based action data structures can be exclusively audio or can be combined with text, image, or video data. The digital components can be exclusively text or can be combined with audio, image or video data. The content provider device 106 can provide manipulated digital components.

The data repository 122 can include one or more local or distributed databases, and can include a database management system. The data repository 122 can include computer data storage or memory and can store one or more dictionaries 124, one or more policies 126, content data 128, or templates 130 among other data. The policies 126 can include rules for the transmissions in a voice-based system. For example, the policies 126 can be used to define sessions, connections (and the establishment thereof) between the client computing device 104 and the data processing system 102. The content data 128 can include digital components or associated metadata, as well as input audio messages that can be part of one or more communication sessions with the client computing device 104. The metadata of the digital component can include an indication of the provider of the digital component (e.g., which content provider device 106, or owner thereof, provided the digital component). The templates 130 can include data structures that can be used in communications the client computing device 104. The templates 130 can include one or more place holders that the data processing system 102 can fill with, for example, content data 128, digital components, or other data.

The dictionaries 124 can be generated by the manipulation detection component 114. The manipulation detection component 114 can generate or update the dictionaries 124 at predetermined intervals. Each manipulation detection component 114 can indicate the most common characters across a plurality of non-manipulated digital components. The dictionaries 124 can be generated by inputting a large number of authentic digital components to the manipulation detection component 114. The dictionaries 124 can be one hot encoded. The manipulation detection component 114 can include an embedding layer for the dictionaries 124. For example, rather than one-hot encoded vectors, the manipulation detection component 114 can use an embedding matrix to keep the size of each dictionary 124 smaller than when compared to using one hot encoding only.

The data repository 122 can include different dictionaries 124 for different languages (e.g., a U.S. English dictionary, a British English dictionary, a French dictionary) or different subject matter dictionaries (e.g., a science dictionary or a clothing dictionary). The different dictionaries 124 can be generated by providing digital components related to that language or subject matter to the manipulation detection component 114. For example, a plurality of digital components related to clothing (e.g., clothing ads) can be provided to the manipulation detection component 114 to generate the clothing dictionary.

The action data structures can include a number of organic or non-sponsored responses to the input audio signal. For example, the action data structures can include a beach weather forecast or directions to a beach. The action data structures in this example include organic, or non-sponsored, content that is directly responsive to the input audio signal. The digital components responsive to the input audio signal can include sponsored or non-organic content, such as an offer to buy sunscreen from a convenience store located near the beach. In this example, the organic action data structure (beach forecast) is responsive to the input audio signal (a query related to the beach), and the digital component (a reminder or offer for sunscreen) is also responsive to the same input audio signal. The data processing system 102 can evaluate system 100 parameters (e.g., power usage, available displays, formats of displays, memory requirements, bandwidth usage, power capacity or time of input power (e.g., internal battery or external power source such as a power source from a wall output)) to provide the action data structure and the digital component to different candidate interfaces on the same client computing device 104, or to different candidate interfaces on different client computing devices 104.

The NLP component 112 can convert the input audio signal into recognized text by comparing the input signal against a stored, representative set of audio waveforms (e.g., in the data repository 122) and choosing the closest matches. The representative waveforms are generated across a large set of users, and can be augmented with speech samples. After the audio signal is converted into recognized text, the NLP component 112 can match the text to words that are associated, for example via training across users or through manual specification, with actions that the data processing system 102 can serve. In some implementations, the manipulation detection component 114 can process or otherwise analyze input audio signals without first converting the audio waveforms into text.

The input audio signal can be detected by the sensor 140 (e.g., a microphone) of the client computing device 104. The sensor 140 can be referred to as an interface of the client computing device 104. Via the transducer 142, the audio driver 144, or other components, the client computing device 104 can provide the input audio signal to the data processing system 102 (e.g., via the network 105) where it can be received (e.g., by the interface 110) and provided to the NLP component 112 or stored in the data repository 122 as content data 128.

The NLP component 112 can receive or otherwise obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to go to the beach for the weekend. The trigger keyword can include at least one word, phrase, root or partial word, or derivative indicating an action to be taken. For example, the trigger keyword "go" or "to go to" from the input audio signal can indicate a need for transport or a trip away from home. In this example, the input audio signal (or the identified request) does not directly express an intent for transport, however the trigger keyword indicates that transport is an ancillary action to at least one other action that is indicated by the request.

The NLP component 112 can identify sentiment keywords or sentiment states in the input audio signal. The sentiment keywords or state can indicate the attitude of the user at the time the user provides the input audio signal. The content selector component 118 can use the sentiment keywords and states to select digital components. Based, for example, on the sentiment keywords and states, the content selector component 118 may skip the selection of a digital component. For example, if the NLP component 112 detects sentiment keywords such as "only" or "just" (e.g., "Ok, just give me the results for the movie times"), the content selector component 118 may skip the selection of a digital component such that only an action data structure is returned in response to the input audio signal.

The audio signal generator component 120 can generate or otherwise obtain an output signal that includes the digital component (as well as the action data structure) responsive to the input audio signal. For example, the data processing system 102 can execute the audio signal generator component 120 to generate or create an output signal corresponding to the action data structure or to the digital component. For example, the audio signal generator component 120 can convert a text-based digital component into an audio-based digital component. The interface component 110 of the data processing system 102 can provide or transmit one or more data packets that include the output signal via the computer network 105 to any client computing device 104. The interface 110 can be designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. For example, the interface 110 can be a network interface or port of the data processing system 102. The interface 110 can facilitate translating or formatting data from one format to another format. For example, the interface 110 can include an application programming interface that includes definitions for communicating between various components, such as software components of the system 100.

The data processing system 102 can provide the output signal including the action data structure from the data repository 122 or from the audio signal generator component 120 to the client computing device 104. The data processing system 102 can provide the output signal including the digital component from the data repository 122 or from the audio signal generator component 120 to the same or to a different client computing device 104.

The data processing system 102 can also instruct, via data packet transmissions, the content provider computing device 106 or other computing device to provide the output signal (e.g., corresponding to the action data structure or to the digital component) to the client computing device 104. The output signal can be obtained, generated, transformed to or transmitted as one or more data packets (or other communications protocol) from the data processing system 102 (or other computing device) to the client computing device 104.

The content selector component 118 can identify, select, or obtain multiple digital components resulting from a multiple content selection processes. The content selection processes can be near real-time, e.g., part of the same conversation, communication session, or series of communications sessions between the data processing system 102 and the client computing device 104 that involve common subject matter. The conversation can include asynchronous communications separated from one another by a period of hours or days, for example. The conversation or communication session can last for a time period from receipt of the first input audio signal until an estimated or known conclusion of a final action related to the first input audio signal, or receipt by the data processing system 102 of an indication of a termination or expiration of the conversation. For example, the data processing system 102 can determine that a conversation related to a weekend beach trip begins at the time or receipt of the input audio signal and expires or terminates at the end of the weekend, e.g., Sunday night or Monday morning. The data processing system 102 that provides action data structures or digital components for rendering by one or more interfaces of the client computing device 104 or of another client computing device 104 during the active time period of the conversation (e.g., from receipt of the input audio signal until a determined expiration time) can be considered to be operating in real-time. In this example the content selection processes and rendering of the digital components and action data structures occurs in real time.

From the information received by the content selector component 118, e.g., an indication of a forthcoming trip to the beach, the content selector component 118 can identify at least one digital component. The digital component can be responsive or related to the subject matter of the input audio query. For example, the digital component can include a data message identifying a store near the beach that has sunscreen, or offering a taxi ride to the beach. The content selector component 118 can query the data repository 122 to select or otherwise identify the digital component, e.g., from the content data 128. The content selector component 118 can also select the digital component from the content provider computing device 106. For example, responsive to a query received from the data processing system 102, the content provider computing device 106 can provide a digital component to the data processing system 102 (or component thereof) for eventual output by the client computing device 104 that originated the input audio signal, or for output to the same end user by a different client computing device 104.

The content selector component 118 can select the digital component or the action data structure as part of a real-time content selection process. For example, the action data structure can be provided to the client computing device 104 for transmission as audio output by an interface of the client computing device 104 in a conversational manner in direct response to the input audio signal. The real-time content selection process to identify the action data structure and provide the digital component to the client computing device 104 can occur within one minute or less from the time of the input audio signal and be considered real-time. The data processing system 102 can also identify and provide the digital component to at least one interface of the client computing device 104 that originated the input audio signal, or to a different client computing device 104.

The action data structure (or the digital component), for example obtained or generated by the audio signal generator component 120 transmitted via the interface 110 and the computer network 105 to the client computing device 104, can cause the client computing device 104 to execute the audio driver 144 to drive the speaker 146 to generate an acoustic wave corresponding to the action data structure or to the digital component. The acoustic wave can include words of or corresponding to the action data structure or digital component.

The action data structures and digital components can correspond to subject matter of the input audio signal. The direct action API 116 can execute programs or scripts, for example from the NLP component 112 or the content selector component 118, to identify action data structures or digital components for one or more of these actions. The direct action API 116 can execute a specified action to satisfy the end user's intention, as determined by the data processing system 102. Depending on the action specified in its inputs, the direct action API 116 can execute code or a dialog script that identifies the parameters required to fulfill a user request. Such code can look up additional information, e.g., in the data repository 122, such as the name of a home automation service, or it can provide audio output for rendering at the client computing device 104 to ask the end user questions such as the intended destination of a requested taxi. The direct action API 116 can determine necessary parameters and can package the information into an action data structure, which can then be sent to another component such as the content selector component 118 or the content provider device 106 to be fulfilled.

The direct action API 116 of the data processing system 102 can generate, based on the request or the trigger keyword, the action data structures. The action data structures can be generated responsive to the subject matter of the input audio signal. Based on the input audio signal parsed by the NLP component 112, the direct action API 116 can determine to which, if any, of a plurality of content provider device 106 the message should be sent. For example, if an input audio signal includes "OK, I would like to go to the beach this weekend," the NLP component 112 can parse the input audio signal to identify requests or trigger keywords such as the trigger keyword "to go to" as an indication of a need for a taxi. The direct action API 116 can package the request into an action data structure for transmission as a message to a content provider computing device 106 of a taxi service. The message can also be passed to the content selector component 118. The action data structure can include information for completing the request. In this example, the information can include a pick up location (e.g., home) and a destination location (e.g., a beach). The direct action API 116 can retrieve a template 130 from the data repository 122 to determine which fields to include in the action data structure. The direct action API 116 can retrieve content from the data repository 122 to obtain information for the fields of the data structure. The direct action API 116 can populate the fields from the template with that information to generate the data structure. The direct action API 116 can also populate the fields with data from the input audio signal. The templates 130 can be standardized for categories of content providers or can be standardized for specific content providers. For example, ride sharing providers can use the following standardized template 130 to create the data structure: {client_device_identifier; authentication_credentials; pick_up_location; destination_location; no_passengers; service_level}.

The data processing system 102 can also provide the action data structure with a prompt that queries the user to determine user interest in obtaining the digital component. For example, the action data structure can indicate "it will be sunny and 80 degrees at the beach on Saturday, would you like to hear about some services to assist with your trip?" The data processing system 102 can receive another input audio signal from the client computing device 104 in response to the prompt "would you like to hear about some services to assist with your trip?" such as "sure". The NLP component 112 can parse this response and interpret it as authorization for audio rendering of the digital component by the client computing device 104. In response, the data processing system 102 can provide the digital component for audio rendering by the same client computing device 104 from which the response "sure" originated.

The data processing system 102 can delay transmission of the digital component associated with the action data structure to optimize processing utilization. For example, the data processing system 102 provide the action data structure for rendering as audio output by the client computing device in real-time responsive to receipt of the input audio signal, e.g., in a conversational manner, and can delay digital component transmission until an off-peak or non-peak period of data center usage, which results in more efficient utilization of the data center by reducing peak bandwidth usage, heat output, or cooling requirements. The data processing system 102 can also initiate a conversion or other activity associated with the digital component, such as ordering a car service responsive to a response to the action data structure or to the digital component, based on data center utilization rates or bandwidth metrics or requirements of the network 105 or of a data center that includes the data processing system 102.

Based on a response to a digital component or to the action data structure for a subsequent action, such as a click on the digital component rendered via the selected interface, the data processing system 102 can identify a conversion, or initiate a conversion or action. Processors of the data processing system 102 can invoke the direct action API 116 to execute scripts that facilitate the conversion action, such as to order a car from a car share service to take the end user to or from the beach. The direct action API 116 can obtain content data 128 (or parameters or policies 126) from the data repository 122, as well as data received with end user consent from the client computing device 104 to determine location, time, user accounts, logistical or other information in order to reserve a car from the car share service.

Figure 2:
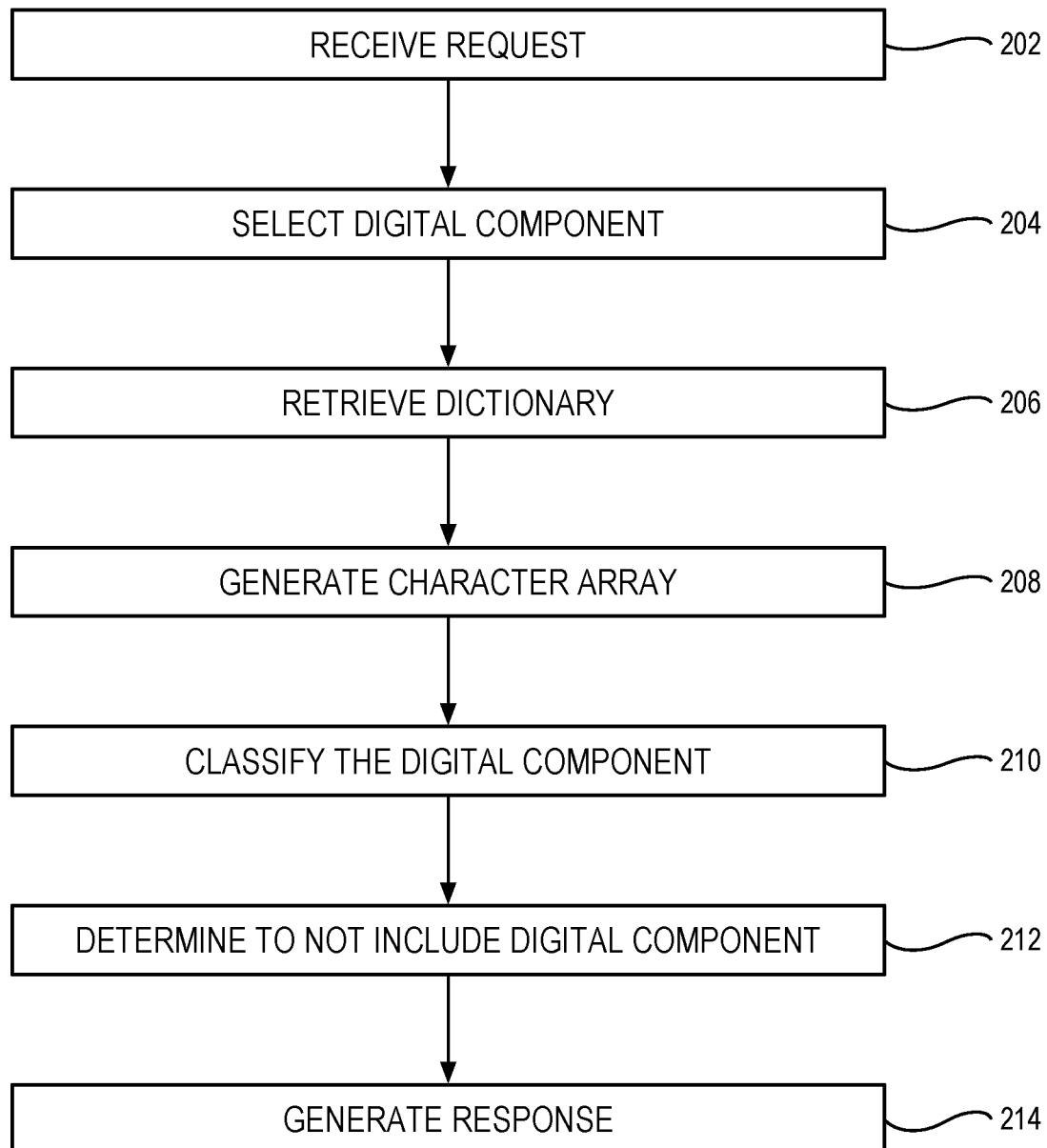
FIG. 2 depicts a method to restrict content transmission in a networked environment in a voice activated computer network environment.

FIG. 2 depicts a flow diagram 200 to restrict the transmission of digital components contained manipulated content. The method 200 can include receiving a request (ACT 202). The method 200 can include selecting a digital component (ACT 204). The method 200 can include retrieving a dictionary (ACT 206). The method 200 can include generating a character array (ACT 208). The method 200 can include classifying the digital component (ACT 210). The method 200 can include determining to not include the digital component in a response (ACT 212). The method 200 can include generating the response (ACT 214).

As set forth above, the method 200 can include receiving a request (ACT 202). The data processing system 102 can receive the request from the client computing device 104. The request can be text-based, image-based, or audio-based. The data processing system 102 can receive the request at an interface, such as a network interface or other interface. For audio-based input signals, the data processing system 102 can execute the NLP component 112, which can parse the input signal to identify the request and one or more trigger keywords in the input audio signal.

The method 200 can include selecting a digital component (ACT 204). The content selector component 118 can select the digital component. The content selector component 118 can select the digital component based on the request and the one or more trigger keywords identified in the request. The selected digital component can include text (e.g., one or more characters). The digital component can be user-generated content, such as user-provided comments or reviews. When the digital components are video-based or audio-based, the manipulation detection component 114 can transcribe the audio from the digital component into a string of characters. The manipulation detection component 114 can determine whether or not to process the digital component based on the selected digital component or its metadata. For example, the metadata can indicate that the digital component was received from a trusted content provider device 106 and the manipulation detection component 114 can determine to include the digital component in a response without determining whether the digital component includes manipulated text because the digital component was received from a trusted content provider device 106.

The method 200 can include retrieving a dictionary (ACT 206). The dictionary can indicate the characters most often found in non-manipulated digital components. The dictionary can include a portion of the total possible characters that can be used in the digital components. The characters in the dictionary can be one hot encoded to form a matrix of one hot encoded characters. For example, each character can form a row of the matrix with the values from the binary array generated from the one hot encoding forming the columns of the row.

The data repository 122 can include a plurality of different dictionaries 124. The data processing system 102 can generate and store the different dictionary 124 for different groupings of digital components. The digital components can be grouped based on the language used in the digital components, region in which the digital component was generated (or is intended to be displayed), or the digital component's subject matter. The manipulation detection component 114 can identify the grouping with which the selected digital component is associated (e.g., which language or subject matter category) and then select the corresponding dictionary 124.

Figure 3:
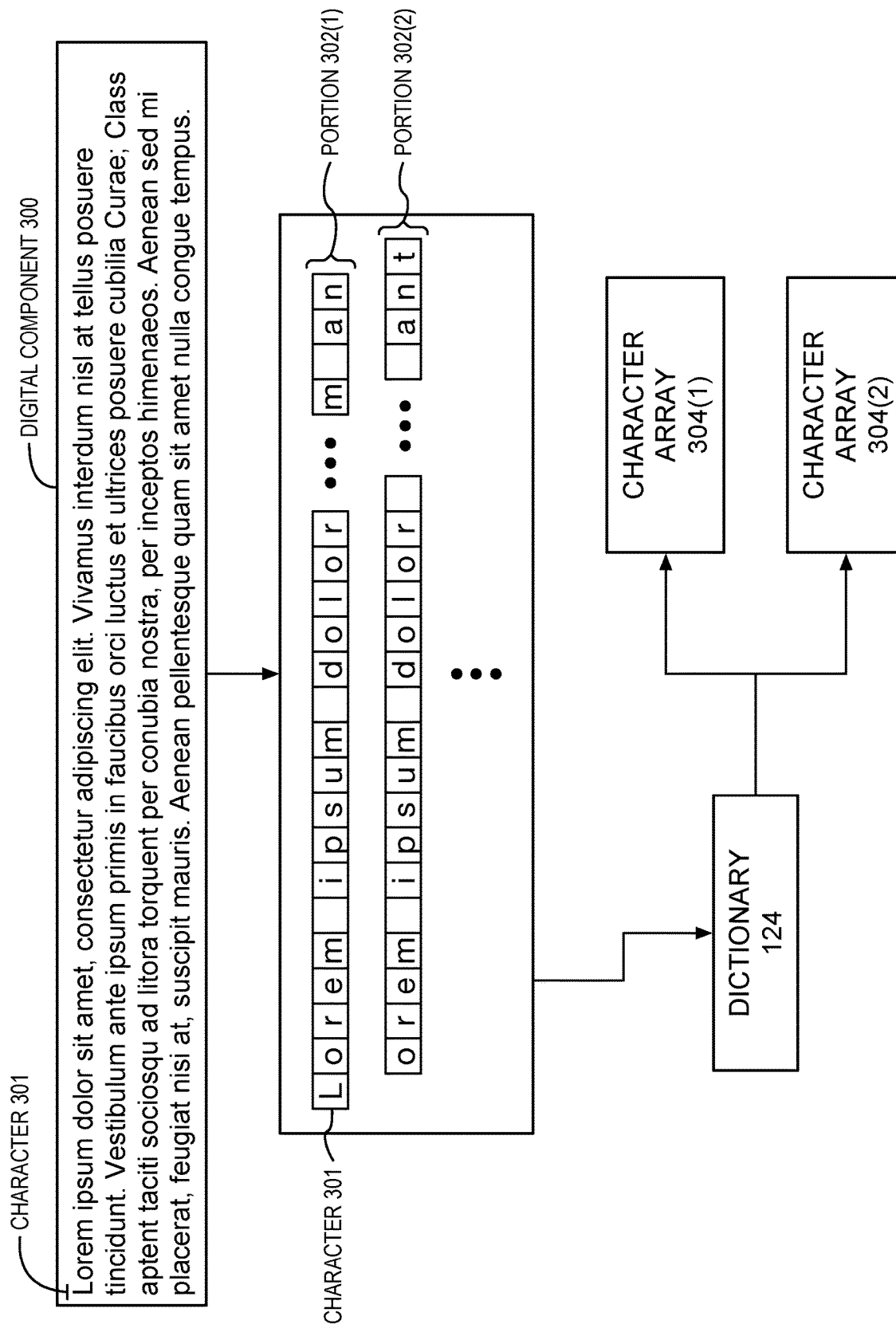
FIG. 3 depicts a process to divide a digital component into a plurality of portions and then convert the portions into character arrays in a voice activated computer network environment.

Also referring to FIG. 3, the method 200 can include generating a character array (ACT 208). FIG. 3 illustrates the process of dividing a digital component 300 into a plurality of portions 302 and then converting the portions 302 into at least one character array 304.

As illustrated in FIG. 3, among others, the digital component 300 can include a plurality of characters 301. The manipulation detection component 114 can divide the plurality of characters into portions 302. The manipulation detection component 114 can analyze character arrays of a predetermined length. For example, the manipulation detection component 114 may generate and analyze character arrays that are between about 1 and about 150 characters, between about 20 and about 150 characters, between about 50 and about 150 characters, between about 100 and about 150 characters, or between about 120 and about 150 characters in length. When, as illustrated in FIG. 3, the digital component 300 includes more characters than the predetermined length, the manipulation detection component 114 can divide the plurality of characters into different portions that are each of a predetermined length (e.g., 120 characters).

When a portion is less than the predetermined length, the portion can be zero-padded to reach the predetermined length. When a digital component 300 is less than the predetermined length in total, the manipulation detection component 114 can generate a single portion that is zero-padded to reach the predetermined length. The different portions can be generated by a sliding window. In some implementations, there is no overlap between the portions. In some examples there can be between 50% and about 99%, between about 60% and about 99%, between about 75% and about 99%, or between about 95% and about 99% overlap between the portions. As illustrated in FIG. 3, the portions 302(1) and 302(2) are generated by sliding the window a distance of one character. In the example illustrated in FIG. 3, if each portion has a length of n characters 301, the overlap is (n-1) characters 301.

Referring to FIGS. 1 and 3, among others, the manipulation detection component 114 can convert each of the portions 302 into character arrays 304 by using the dictionary 124 selected and retrieved at ACT 206. For example, as illustrated in FIG. 3, the portion 302(1) can be converted into the character array 304(1) and the portion 302(2) can be converted into the character array 304(2). The character arrays 304 can be a data structure that includes an array of values. Each character 301 in a portion 302 can be converted to a value (or integer) in the character array 302 by using the character 301 as an input to the dictionary 124 which can be used as a lookup table for converting between characters 301 and their respective integers. The character arrays 304 can be one hot encoded. For example, each value of the character array 304 can be converted into a binary array. The dictionary index can be one hot encoded to generate one hot encoded character arrays when converting the characters to integers.

Referring to FIG. 2, among others, the method 200 can include classifying the digital component (ACT 210). The manipulation detection component 114 can classify the digital component into a first class of a plurality of classes. The classification by the manipulation detection component 114 can be based on a sequence (or order) of the first plurality of characters in the character array. For example, the characters from the digital component (or one hot encoded versions of the characters) can be sequentially fed into the manipulation detection component's classifier as inputs. The classifier can have two output classes: a manipulated class and a non-manipulated class. The classifier can be, include, or be part of a long short-term memory neural network.

The method 200 can include determining to not include the digital component in a response (ACT 212). The determination to not include the digital component into the response to the content request from the client computing device can be based on the classification of the digital component into the manipulated class. If, for example, the digital component is classified into the manipulated class, the digital component can be removed or purged from the data repository 122 or restricted or excluded from further consideration during the content selection process (e.g., ACT 204).

The method 200 can include generating a response (ACT 214). The response can be generated responsive to the request received at ACT 202. The data processing system 102 can generate the response to not include the digital component selected at ACT 204. The decision to not include the digital component can be based on the classification of the digital component in the manipulated category.

The manipulation detection component 114 can instruct the content selector component 118 to select a second digital component based on determining to not include the originally selected digital component in the response because the selected digital component was classified into the manipulated category. The manipulation detection component 114 can repeat ACTS 206-210 to classify the second digital component. The manipulation detection component 114 can repeat the above ACTs until a digital component is selected that is classified into the non-manipulated class. The digital component classified into the non-manipulated class can be included into the response.

The manipulation detection component 114 can classify a content provider device 106 as an untrusted content provider if the manipulation detection component 114 determines that a predetermined number of digital components from the content provider device 106 are classified as manipulated. Once classified as an untrusted content provider, the data processing system 102 may not request (or may automatically reject) digital components from the untrusted content provider. The manipulation detection component 114 can classify a content provider device 106 as a trusted content provider if the manipulation detection component 114 determines that a predetermined number of digital components from the content provider device 106 are classified as non-manipulated. Based on being classified as a trusted content provider device, the manipulation detection component 114 may not process the digital components from the trusted content provider device to determine if they include manipulated text or the manipulation detection component 114 can only process a portion of the digital components form the trusted content provider device. For example, the manipulation detection component 114 may only process every nth digital component from the trusted content provider device. The manipulation detection component 114 can mark the content provider device 106 as a trusted content provider based on establishing the owner or authenticity of the content provider device 106. For example, the data processing system 102 can flag a content provider device 106 as a trusted content provider if, for example, during registration with the data processing system 102, the content provider device's identification can be verified.

The input request can be voice-based and the digital component that is included in the response can be text-based, such as a user generated review or comment. The audio signal generator component can convert the digital component into a output audio file to be transmitted and rendered at the client computing device 104.

Figure 4:
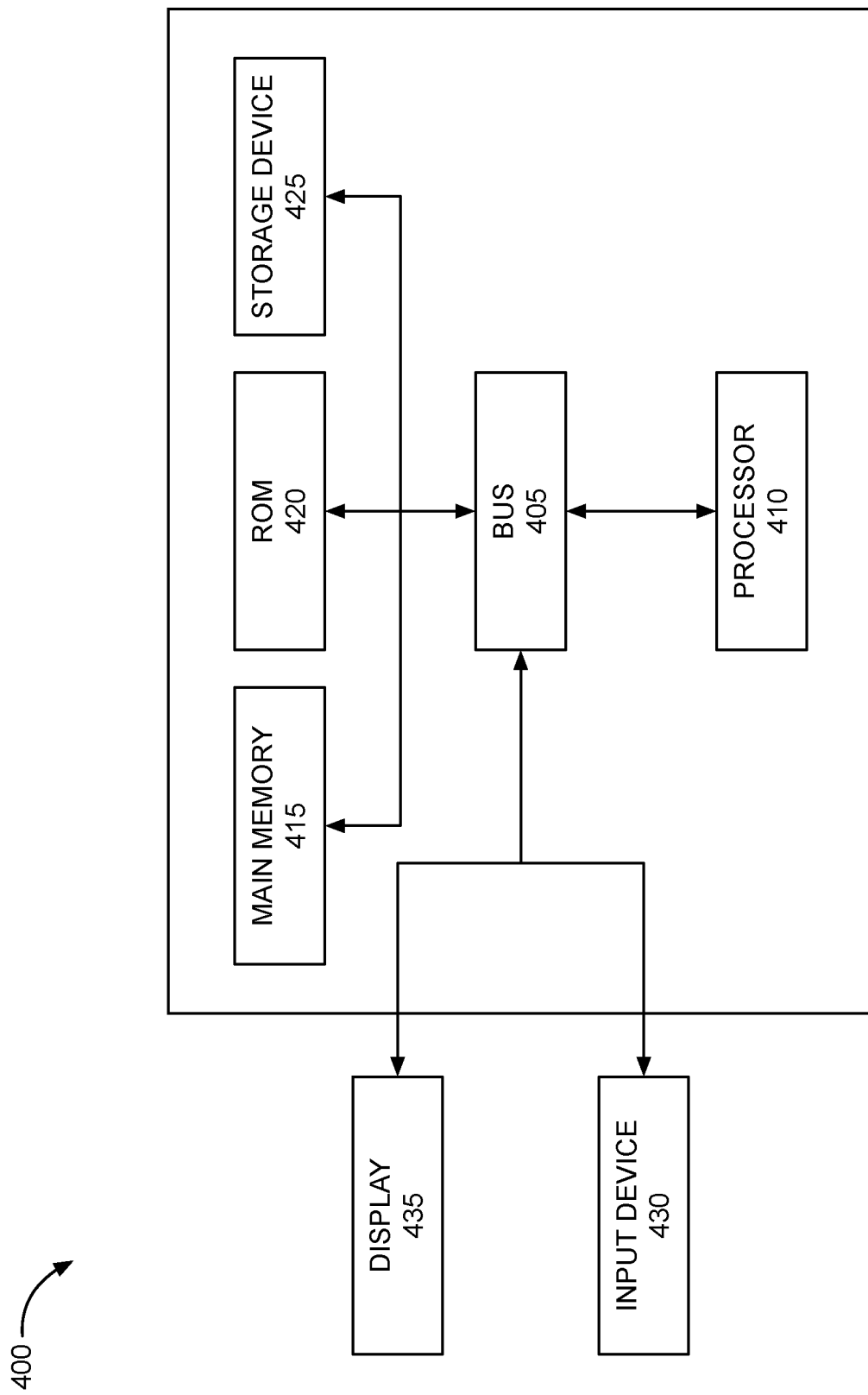
FIG. 4 is a block diagram illustrating a general architecture for a computer system that may be employed to implement elements of the systems and methods described and illustrated herein.

FIG. 4 is a block diagram of an example computer system 400. The computer system or computing device 400 can include or be used to implement the system 100, or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 122. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 122.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., a field programmable gate array (FPGA) or an application specific integrated circuit (ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 116, content selector component 118, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA or an ASIC. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing action data structures or digital components) to a client device (e.g., to the client computing device 104 for purposes of displaying data to and receiving user input from a user interacting with the client device, or the content provider computing device 106). Data generated at the client device (e.g., a result of the user interaction) can be received from the client device at the server (e.g., received by the data processing system 102 from the computing device 104 or the content provider computing device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 118 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to restrict content transmission in a networked environment, comprising:
    an interface of a data processing system to receive a content request from a client computing device;
    a content selector component, executed by the data processing system, to select a first digital component from a plurality of digital components based on the content request and a trigger keyword, the first digital component comprising a first plurality of characters from a plurality of candidate characters; and
    a manipulation detection component, executed by the data processing system, to:

receive an input audio signal comprising the content request;
parse the input audio signal to identify the content request and the trigger keyword;
determine a number of occurrences of each of the plurality of candidate characters included in the plurality of digital components;
retrieve a dictionary comprising an indication of a portion of candidate characters included in a plurality of digital components, wherein the dictionary indicates the number of occurrences of each of the plurality of candidate characters in the plurality of digital components;
convert the first plurality of characters into a character vector based on the dictionary comprising the indication of the portion of the candidate characters included in the plurality of digital components;
classify the first digital component into a first class of a plurality of classes based on a sequence of the first plurality of characters in the character vector;
determine to not include the first digital component in a response to the content request from the client computing device based on the classification of the first digital component into the first class of the plurality of classes; and
generate the response based on the content request from the client computing device, the response not including the first digital component based on the determination to not include the first digital component in the response.

2. The system of claim 1, comprising:
the interface to receive a second content request from the client computing device;
the content selector component to select a second digital component based on the second content request, the second digital component comprising a second plurality of characters; and
the manipulation detection component to:
divide the second plurality of characters into a first portion and a second portion;
convert the first portion of the second plurality of characters into a second character vector and the second portion of the second plurality of characters into a third character vector; and
classify the second digital component into the first class of the plurality of classes based on a sequence of the second plurality of characters in the first portion and a sequence of the second plurality of characters in the second portion.

3. The system of claim 1, comprising the manipulation detection component to:
one hot encode the character vector; and
one hot encode the portion of the candidate characters included in the plurality of digital components.

4. The system of claim 1, comprising:
the manipulation detection component to convert an audio output of the first digital component into the first plurality of characters.

5. The system of claim 1, comprising:
the content selector component to select a second digital component based on determining to not include the first digital component in the response, the second digital component comprising a second plurality of characters; and
the manipulation detection component to:
convert the second plurality of characters into a second character vector;
classify the second digital component into a second class of the plurality of classes based on a sequence of the second plurality of characters in the second character vector; and
include the second digital component in the response.

6. The system of claim 5, comprising:
an audio signal generator component to convert the second digital component into an output audio file.

7. The system of claim 1, comprising:
the content selector component to select a second digital component based on determining to not include the first digital component in the response, the second digital component comprising a second plurality of characters; and
the manipulation detection component to:
identify a language associated with the second digital component;
select a second dictionary based on the language associated with the second digital component;
convert the second plurality of characters into a second character vector based on the second dictionary;
classify the second digital component into a second class of the plurality of classes based on a sequence of the second plurality of characters in the second character vector; and
include the second digital component in the response.

8. The system of claim 1, comprising the manipulation detection component to:
receive the plurality of digital components;
select the portion of candidate characters included in the plurality of digital components based on the number of occurrences of each of the plurality of candidate characters in the plurality of digital components.

9. The system of claim 8, wherein the number of occurrences of each of the portion of candidate characters included in the plurality of digital components is greater than the number of the occurrences of each of the candidate characters not included in the portion of the candidate characters.

10. The system of claim 1, wherein the first digital component is a visual uniform resource locator (vURL).

11. The system of claim 1, comprising:
the manipulation detection component to classify the first digital component into the first class of the plurality of classes using a long short-term memory neural network.

12. The system of claim 1, wherein the dictionary comprises a matrix of one hot encoded characters, the one hot encoded characters comprising a portion of characters included in a plurality of training digital components.

13. A method to restrict content transmission in a networked environment:
receiving, by a data processing system, a content request from a client computing device, the content request having a trigger keyword;
selecting, by a content selector component executed by the data processing system, a first digital component from a plurality of digital components based on the content request and the trigger keyword, the first digital component comprising a first plurality of characters;
determining a number of occurrences of each of a plurality of candidate characters included in the plurality of digital components;
retrieving, by a manipulation detection component executed by the data processing system, a dictionary comprising an indication of a portion of candidate characters included in a plurality of digital components, wherein the dictionary indicates the number of occurrences of each of the plurality of candidate characters in the plurality of digital components;
converting, by the manipulation detection component, the first plurality of characters into a character vector based on the dictionary comprising the indication of the portion of the candidate characters included in the plurality of digital components;
classifying the first digital component into a first class of a plurality of classes based on a sequence of the first plurality of characters in the character vector;
determining, by the manipulation detection component, to not include the first digital component in a response to the content request from the client computing device based on the classification of the first digital component into the first class of the plurality of classes; and
generating, by the data processing system, the response based on the content request from the client computing device, the response not including the first digital component based on the determination to not include the first digital component in the response.

14. The method of claim 13, comprising:
receiving, by the data processing system, a second content request from the client computing device;
selecting, by the content selector component, a second digital component based on the second content request, the second digital component comprising a second plurality of characters;
dividing, by the manipulation detection component, the second plurality of characters into a first portion and a second portion;
converting, by the manipulation detection component, the first portion of the second plurality of characters into a second character vector and the second portion of the second plurality of characters into a third character vector; and
classifying, by the manipulation detection component, the second digital component into the first class of the plurality of classes based on a sequence of the second plurality of characters in the first portion and a sequence of the second plurality of characters in the second portion.

15. The method of claim 13, comprising:
selecting, by the content selector component, a second digital component based on determining to not include the first digital component in the response, the second digital component comprising a second plurality of characters;
converting, by the manipulation detection component, the second plurality of characters into a second character vector;
classifying, by the manipulation detection component, the second digital component into a second class of the plurality of classes based on a sequence of the second plurality of characters in the second character vector; and
including, by the manipulation detection component, the second digital component in the response.

16. The method of claim 13, comprising:
selecting, by the content selector component, a second digital component based on determining to not include the first digital component in the response, the second digital component comprising a second plurality of characters;
identifying, by the manipulation detection component, a language associated with the second digital component;
selecting, by the manipulation detection component, a second dictionary based on the language associated with the second digital component;
converting, by the manipulation detection component, the second plurality of characters into a second character vector based on the second dictionary;
classifying, by the manipulation detection component, the second digital component into a second class of the plurality of classes based on a sequence of the second plurality of characters in the second character vector; and
including, by the manipulation detection component, the second digital component in the response.

17. The method of claim 13, comprising:
receiving, by the manipulation detection component, the plurality of digital components;
selecting, by the manipulation detection component, the portion of candidate characters included in the plurality of digital components based on the number of occurrences of each of the plurality of candidate characters in the plurality of digital components.

18. A digital assistant device, comprising:
an audio driver;
a transducer;
a sensor to detect an input audio signal; and
a pre-processor component coupled to the audio driver, the transducer, and the sensor, the pre-processor to:
filter the input audio signal to create a filtered input audio signal;
convert the filtered input audio signal to data packets; and
transmit the data packets to a data processing system comprising one or more processors and memory that execute a natural language processor component, a content selector component, an interface, and a manipulation detection component, the data processing system to:
receive, via the interface, from the pre-processor component, the data packets comprising the filtered input audio signal detected by the sensor;
identify, by the natural language processor component, a content request in the filtered input audio signal, the content request having a trigger keyword;
select, by the content selector component, a first digital component from a plurality of digital components based on the content request, the first digital component comprising a first plurality of characters;
determine a number of occurrences of each of a plurality of candidate characters included in the plurality of digital components;
retrieve, by the manipulation detection component, a dictionary comprising an indication of a portion of candidate characters included in a plurality of digital components, and wherein the dictionary indicates the number of occurrences of each of the plurality of candidate characters in the plurality of digital components;
convert, by the manipulation detection component, first plurality of characters into a character vector based on the dictionary comprising the indication of the portion of the candidate characters included in the plurality of digital components;
classify, by the manipulation detection component, the first digital component into a first class of a plurality of classes based on a sequence of the first plurality of characters in the character vector;
determine, by the manipulation detection component, to not include the first digital component in a response to the content request from the client computing device based on the classification of the first digital component into the first class of the plurality of classes; and generate, by the manipulation detection component, the response based on the content request from the client computing device, the response not including the first digital component based on the determination to not include the first digital component in the response.

19. The digital assistant device of claim 18, comprising:
the sensor to detect a second input audio signal; and
the pre-processor component to transmit the second input audio signal to the data processing system, the data processing system to:
- receive, by the interface, the second input audio signal;
- identify, by the natural language processor component, a second content request in the second input audio signal;
- select, by the content selector component, a second digital component based on the second content request, the second digital component comprising a second plurality of characters; and
- divide, by the manipulation detection component, the second plurality of characters into a first portion and a second portion;
- convert, by the manipulation detection component, the first portion of the second plurality of characters into a second character vector and the second portion of the second plurality of characters into a third character vector; and
- classify, by the manipulation detection component, the second digital component into the first class of the plurality of classes based on a sequence of the second plurality of characters in the first portion and a sequence of the second plurality of characters in the second portion.

20. The digital assistant device of claim 18, comprising:
the data processing system to:
- select a second digital component based on determining to not include the first digital component in the response, the second digital component comprising a second plurality of characters;
- convert the second plurality of characters into a second character vector;
- classify the second digital component into a second class of the plurality of classes based on a sequence of the second plurality of characters in the second character vector; and
- include the second digital component in the response.

* * * * *